United States Patent Office 2,965,552
Patented Dec. 20, 1960

2,965,552

METHOD FOR THE PREPARATION OF PURE ELEMENTAL PHOSPHORUS

Bernard A. Gruber, Dayton, Ohio, assignor to Monsanto Chemical Company, St. Louis, Mo., a corporation of Delaware No Drawing. Filed Dec. 30, 1957, Ser. No. 705,829

14 Claims. (Cl. 204—60)

This invention relates to a method for producing elemental phosphorus in a very pure form.

It is an object of the invention to prepare phosphorus which is free from the conventional impurities, such as compounds and elements of group 7 of the periodic table. It is also an object of the invention to prepare elemental phosphorus by the electrolysis of phosphates. Other objects of the invention are set forth in the description below.

It has been desired for many years to obtain elemental phosphorus in a very pure form, particularly in the preparation of semi-conductor components such as boron phosphide and indium phosphide. However, the order of purity which is necessary for such purposes requires that foreign elements and their compounds particularly the group VI and group VII elements, such as arsenic, antimony, bismuth, sulfur, selenium, tellurium, aluminum, gadolinium and chlorine be present in less than a fraction of one part per million. The use of conventional refining methods for the phosphorous have not been effective in obtaining such pure forms.

It has now been found that exceedingly pure elemental phosphorus may be obtained by the electrolysis of various phosphorus salts such as phosphates and phosphites, including the polyphosphates as the cell electrolyte. A preferred compound in this relationship is sodium metaphosphate, $NaPO_3$, although the various phosphorous salts, preferably tetrasodium pyrophosphate or sodium tripolyphosphate may similarly be employed as the starting material. Other potassium and sodium compounds of phosphorus of particular utility are the di-alkali and tri-alkali phosphates, the hexametaphosphates and the various ortho-, meta- and poly-phosphates which have a molar Na:P ratio of at least one. In another embodiment of the invention, the phosphate is employed in combination with a boron oxide, a boric acid or an alkali or alkaline earth borate (e.g., sodium tetraborate or calcium metaborate), the preferred compound being a boron oxide, the relative molar proportion of the boron compound with respect to the phosphorus compound being from 0.001 to 2, a preferred range being from 0.01 to 1. An example of a specific combination which has been found to be of utility is 16 moles of the sodium metaphosphate with one mole of boric oxide.

Another cell electrolyte which may advantageously be employed in the present process is boron phosphate, $BPO_4$. Boron phosphate is known to have a high melting point, but this compound may readily be used in the present process by dissolving the boron phosphate in a suitable solvent compound such as sodium fluoride or a sodium phosphate. The potassium compounds may similarly be used.

As an adjunct material in order to increase the fluidity of the cell electrolyte, and also to increase the conductivity thereof, additional salts such as alkali halides, for example, sodium fluoride and potassium chloride may also be present. When such additive materials are employed they may be present in the relative proportion of from 5 to 80 mole percent relative to the cell electrolyte mixture, a preferred range being from 20 to 50 mole percent.

The present process is conducted in an electrolytic cell having an anode and a cathode. The vessel itself may be utilized as either the anode or cathode if desired. The anode is made of a form of carbon such as graphite, including the conventional graphite electrodes prepared from petroleum carbon and bonded with pitch. The cathode may also be made of graphite or a metal such as iron or other ferrous alloys, for example, the stainless steels, as well as nickel or molybdenum.

The electrolytic process of the present invention may be conducted without the necessity for employing a diaphragm in the cell. However, it may be desirable, particularly at high rates of production to introduce a diaphragm which prevents mixing of the anolyte and catholyte. The diaphragm is made from a porous form of a ceramic material such as alumina. The present process may also make use of a partition in the vapor phase to prevent mixing of the gaseous anode and cathode products. Such a partition or separator is usually made of a non-porous chemically resistant material such as graphite, alumina, silica or other ceramic.

The present electrolytic process employing a fluid melt is conducted at a temperature in the range of from 600° C. to 1,000° C., a preferred temperature rang being from 800° C. to 900° C. The pressure in the electrolytic cell is normally atmospheric, although it is possible to operate with moderate degrees of pressure and vacuum as may be desired to control the flow of materials leaving the electrolytic cell.

The electrical conditions employed for the production of elemental phosphorus in the above-described system include a voltage range of from 1 to 10 volts as the cell voltage, a preferred range being from 1.5 to 5 volts. The current density employed in this process is from 100 to 5,000 amperes per square foot. A preferred range for the current density is from 700 to 3,000 amperes per square foot.

The mechanism of the present process has not been completely elucidated, although it has clearly been demonstrated that gaseous elemental phosphorus is produced directly at the electrode and is vaporized from the cell. The oxygen of the phosphate ultimately leaves the system from the carbon electrode as oxides of carbon. The phosphorus may be condensed directly in a condenser system and be collected by conventional means. Inasmuch as the phosphorus leaves the cell in gaseous form at a relatively high temperature, such as about 800° C., it is likewise feasible to oxidize such product phosphorus directly by adding air or oxygen to the gas stream with the resultant production of phosphorus pentoxide, which is then condensed and collected as the ultimate product. In this relationship, it is also feasible to introduce the air or oxygen directly to the electrolytic cell to bring about the oxidation of the phosphorus as formed. On the other hand, if it is desired to avoid any oxidative effects of the phosphorus being produced, the cell may be provided with an inert gas stream such as nitrogen or argon, which thus avoids any introduction of foreign reactive gases into the electrolytic cell or the contamination of the elemental phosphorus by undesired elements and compounds including dissolved gases. The present process also makes it possible to produce anhydrous phosphorus of an unusual degree of purity, since the electrolytic process is conducted under anhydrous conditions and permits the use of a collection system blanketed with an inert gas such as argon. In the instant process, an electrolytic reaction is clearly involved since it has been found that the production of phosphorus does not begin in the heated cell until the electric current begins to pass.

In the continuous operation of the present method, the phosphorus may be withdrawn as a gaseous product which is continuously being evolved at the electrode. The charge material, either an alkali phosphate, boron phosphate, or a mixture of an alkali phosphate and a borate, a boric acid or boron oxide, is admitted directly to the molten electrolyte mass. Such introduction of said materials may be accomplished by pumping in a fluid melt, or may be accomplished through the use of a preparation section of the cell in which the raw materials are first charged and permitted to evolve steam and other gases before being admitted to the electrolytic section of the cell.

The following examples illustrate specific embodiments of the present invention.

Example 1

The production of elemental phosphorus from a phosphate was conducted using a charge of 204 g. of sodium metaphosphate $NaPO_3$ and 21 g. of NaF. The mixture was heated to a temperature of 850° C. The cell voltage was 2.7 volts at a current of 20 amperes. The graphite crucible served as the anode and a half inch diameter graphite rod as the cathode. It was found that elemental phosphorus was evolved from the electrode and could readily be collected. The product is elemental phosphorus of high purity.

Example 2

A cell charged for the production of elemental phosphorus was prepared by mixing 122 g. of sodium acid phosphate monohydrate and 66 g. of boric oxide. The electrolytic cell was heated to a temperature of 800° C. at which point the fluidity of the melt was increased by adding about 10 g. of potassium chloride. The electrodes consisted of a one-half inch graphite rod as the anode located in the center of the graphite crucible which served as the cathode. The electrolysis began at a cell voltage of 5 volts and with an amperage of 15 amperes. It was found that during the steady state operation of the cell the voltage could be reduced to 2.6 volts with the cell operating at 5 amperes. During the electrolysis, gaseous elemental phosphorus was evolved at the anode and removed from the cell. The phosphorus thus produced is substantially free of group VI and VII contaminants. At the conclusion of the run, the electrolyte was withdrawn. The soluble phosphates and chlorides were leached out to leave an insoluble component which was found to correspond to boron phosphate by X-ray diffraction.

Example 3

A cell electrolyte was prepared by mixing 275 g. of sodium acid phosphate monohydrate, 21 g. of sodium fluoride, and 8.7 g. of boric acid. The electrolysis was conducted in the apparatus described in Example 1, the initial conditions being 2.3 volts and 10 amperes. The electrolysis was found to run smoothly with the cell voltage varying from 0.9 to 2.7 volts and with the amperage on the cell varying from 12 to 25 amperes. It was found that phosphorus in gaseous form was evolved in copious quantities during the operation of the cell and could readily be withdrawn for collection.

What is claimed is:

1. Process for the production of elemental phosphorus which comprises electrolyzing a molten bath consisting of an electrolyte selected from the group consisting of an alkali phosphate, boron phosphate, and mixtures of alkali phosphates with at least one compound selected from the group consisting of boron oxides, boric acid, alkali borates and alkaline earth borates in which mixtures the relative molar proportion of the boron compound relative to the phosphate compound is in the range of from 0.001 to 2 and, evolving phosphorus and collecting the same.

2. Process for the production of elemental phosphorus which comprises electrolyzing a molten bath consisting of an electrolyte selected from the group consisting of an alkali phosphate, boron phosphate, and mixtures of alkali phosphates with at least one compound selected from the group consisting of boron oxides, boric acid, alkali borates, and alkaline earth borates, the said electrolysis being conducted at a temperature in the range of from 600° C. to 1,000° C., and with a cell voltage of from 1 to 10 volts and a current density of from 100 to 5,000 amperes per square foot in which mixtures the relative molar proportion of the boron compound relative to the phosphate compound is in the range of from 0.001 to 2 and, evolving phosphorus and collecting the same.

3. Process for the production of elemental phosphorus which comprises electrolyzing a molten bath consisting of an electrolyte selected from the group consisting of an alkali phosphate, boron phosphate, and mixtures of alkali phosphates with at least one compound selected from the group consisting of boron oxides, boric acid, alkali borates, and alkaline earth borates, the said electrolysis being conducted at a temperature in the range of from 800° C. to 900° C. and with a cell voltage of from 1.5 to 5 volts and with a current density of from 700 to 3,000 amperes per square foot in which mixtures the relative molar proportion of the boron compound relative to the phosphate compound is in the range of from 0.001 to 2 and, evolving phosphorus and collecting the same.

4. Process for the production of elemental phosphorus which comprises electrolyzing a molten bath consisting of a mixture of a sodium phosphate, with at least one compound selected from the group consisting of boron oxides, boric acid, alkali borates and alkaline earth borates in which mixtures the relative molar proportion of the boron compound relative to the phosphate compound is in the range of from 0.001 to 2 and, evolving phosphorus and collecting the same.

5. Process for the production of elemental phosphorus which comprises electrolyzing a molten bath consisting of a mixture of a sodium phosphate and a boron oxide in which mixture the relative molar proportion of the boron oxide relative to the sodium phosphate is in the range of from 0.001 to 2, and, evolving phosphorus and collecting the same.

6. Process for the production of elemental phosphorus which comprises electrolyzing a molten bath consisting of a sodium phosphate and a boron oxide in which mixture the relative molar proportion of the boron oxide relative to the sodium phosphate is in the range of from 0.001 to 2, and, the said electrolysis being conducted at a temperature in the range of from 600° C. to 1,000° C., and with a cell voltage of from 1 to 10 volts and a current density of from 100 to 5,000 amperes per square foot, evolving phosphorus and collecting the same.

7. Process for the production of elemental phosphorus which comprises electrolyzing a molten bath consisting of a sodium phosphate and a boron oxide in which mixture the relative molar proportion of the boron oxide relative to the sodium phosphate is in the range of from 0.001 to 2, and, the said electrolysis being conducted at a temperature in the range of from 800° C. to 900° C., and with a cell voltage of from 1.5 to 5 volts and with a current density of from 700 to 3,000 amperes per square foot, evolving phosphorus and collecting the same.

8. Process for the production of elemental phosphorus which comprises electrolyzing a molten bath consisting of a sodium phosphate in combination with a boron oxide, the relative molar proportion of the said boron oxide relative to the said phosphate compound being in the range of from 0.001 to 2, and as a modifying agent therein an alkali halide, the said modifying agent being present in the proportion of from 5 mole percent to 90 mole percent relative to the aforesaid electrolyte, evolving phosphorus and collecting the same.

9. Process for the production of elemental phosphorus which comprises electrolyzing a molten bath consisting of a sodium phosphate in combination with a boron oxide, the relative molar proportion of the said boron oxide relative to the said phosphate compound being in the range of from 0.01 to 1, and as a modifying agent therein an alkali halide, the said modifying agent being present in the proportion of from 40 mole percent to 90 mole percent by weight relative to the weight of the aforesaid electrolyte, the said electrolysis being conducted at a temperature in the range of from 600° C. to 1,000° C., and with a cell voltage of from 1 to 10 volts and a current density of from 100 to 5,000 amperes per square foot, evolving phosphorus and collecting the same.

10. Method for the preparation of elemental phosphorus which comprises electrolyzing molten boron phosphate, in a cell, evolving phosphorus from the said molten boron phosphate and collecting the said phosphorus.

11. Process for the production of elemental phosphorus which comprises electrolyzing molten boron phosphate and as a modifying agent therein an alkali halide, the said modifying agent being present in the proportion of from 5 mole percent to 80 mole percent by weight relative to the weight of the aforesaid electrolyte, the said electrolysis being conducted at a temperature in the range of from 800° C. to 900° C., and with a cell voltage of from 1.5 to 5 volts and with a current density of from 700 to 3,000 amperes per square foot, evolving phosphorus and collecting the same.

12. Method for the preparation of elemental phosphorus which comprises electrolyzing a molten electrolyte consisting of $NaPO_3$ in combination with a boron compound selected from the class consisting of boron oxides, boric acid, alkali borates, and an alkaline earth borate, the relative proportion of the said boron compound and the said phosphate compound being in the range of from 0.001 to 2, evolving phosphorus and collecting the same.

13. Method for the preparation of elemental phosphorus which comprises electrolyzing a molten electrolyte consisting of $NaPO_3$ in combination with a boron compound selected from the class consisting of boron oxides, boric acid, an alkali borate, and an alkaline earth borate, the relative molar proportion of the said boron compound with respect to the phosphate compound being in the range of from 0.01 to 1, the said electrolysis being conducted at a temperature in the range of from 600° C. to 1,000° C., and with a cell voltage of from 1 to 10 volts and a current density of from 100 to 5,000 amperes per square foot, evolving phosphorus and collecting the same.

14. Method for the preparation of elemental phosphorus which comprises electrolyzing a molten electrolyte consisting of $NaPO_3$ in combination with a boron compound selected from the class consisting of boron oxides, boric acid, an alkali borate, and an alkaline earth borate, the relative molar proportion of the said boron compound with respect to the said phosphate compound being in the range of from 0.01 to 1, the said electrolysis being conducted at a temperature in the range of from 800° C. to 900° C., and with a cell voltage of from 0.5 to 5 volts and with a current density of from 700 to 3,000 amperes per square foot, evolving phosphorus and collecting the same.

References Cited in the file of this patent

UNITED STATES PATENTS

| 2,810,683 | Ellis | Oct. 22, 1957 |

FOREIGN PATENTS

| 658,521 | France | Jan. 26, 1929 |